(12) United States Patent
Noh (10) Patent No.: US 7,487,959 B2
(45) Date of Patent: Feb. 10, 2009

(54) EJECT MECHANISM WITH GRIP IN FINISHER

(75) Inventor: Seung Kyoon Noh, Seoul (KR)

(73) Assignees: KRDC Co., Ltd. (KR); Gradco Ltd., Tokyo (JP)

( * ) Notice: Subject to any disclaimer, the term of this patent is extended or adjusted under 35 U.S.C. 154(b) by 1616 days.

(21) Appl. No.: 10/196,180

(22) Filed: Jul. 17, 2002

(65) Prior Publication Data

US 2003/0025888 A1    Feb. 6, 2003

(30) Foreign Application Priority Data

Jul. 19, 2001    (KR) .............................. 2001-43547

(51) Int. Cl.
*B65H 37/04*    (2006.01)

(52) U.S. Cl. .............. 270/58.12; 270/58.01; 270/58.07; 270/58.08; 270/58.09; 270/58.11; 270/58.17; 270/58.27; 198/484.1; 198/867.1; 198/803.1

(58) Field of Classification Search ............. 270/58.01, 270/58.07, 58.08, 58.09, 58.11, 58.12, 58.17, 270/58.27; 198/484.1, 867.1, 803.1

See application file for complete search history.

(56) References Cited

U.S. PATENT DOCUMENTS

| | | | | |
|---|---|---|---|---|
| 1,615,194 A | * | 1/1927 | Swab ...................... 198/803.1 |
| 4,789,147 A | * | 12/1988 | Berger et al. ................ 270/1.03 |
| 5,782,337 A | * | 7/1998 | Langland .................. 198/803.1 |
| 6,015,145 A | * | 1/2000 | Hartel .......................... 271/98 |
| 6,047,960 A | * | 4/2000 | Kawano et al. ............. 271/184 |
| 6,641,133 B2 | * | 11/2003 | Mutschall et al. ........... 271/204 |

* cited by examiner

*Primary Examiner*—Gene Crawford
*Assistant Examiner*—Leslie A Nicholson, III
(74) *Attorney, Agent, or Firm*—Greenblum & Bernstein, P.L.C.

(57) ABSTRACT

An eject mechanism with a grip in a finisher is disclosed, in which papers ejected from a digital output device are temporarily stacked on a paper eject tray and exactly aligned so that the papers are gripped to move to a stacker tray without scattering. The eject mechanism with a grip in a finisher includes a paper eject tray that temporarily receives papers ejected from a digital output device, a paper moving means gripping the papers received in the paper eject tray to move them, and a stacker tray stacking the papers moved from the paper moving means, wherein the paper moving means includes a guide side plate provided with a rail groove circulating along the papers and a curved cam disposed near the rail groove, a paper grip means driven to grip the papers received in the paper eject tray when it is in contact with the curved cam while moving along the rail groove of the guide side plate, and a driving means that drives the paper grip means to circulate it along the rail groove.

8 Claims, 13 Drawing Sheets

Fig 1

Prior Art

Fig 2

Prior Art

EJECT MECHANISM WITH GRIP IN FINISHER

BACKGROUND OF THE INVENTION

1. Field of the Invention

The present invention relates to a finisher that connected to a digital output device such as a copier and a printer so as to align and eject papers, and more particularly, to an eject mechanism with a grip in a finisher in which papers are ejected onto a stacker tray that receives the papers, without scattering.

2. Discussion of the Related Art

Generally, an image forming device such as a copier and a printer includes a stapling function for stapling papers in the finishing process of ejecting the papers onto a stacker tray from a medium and an aligning function for aligning papers ejected on the stacker tray.

Figure 1:
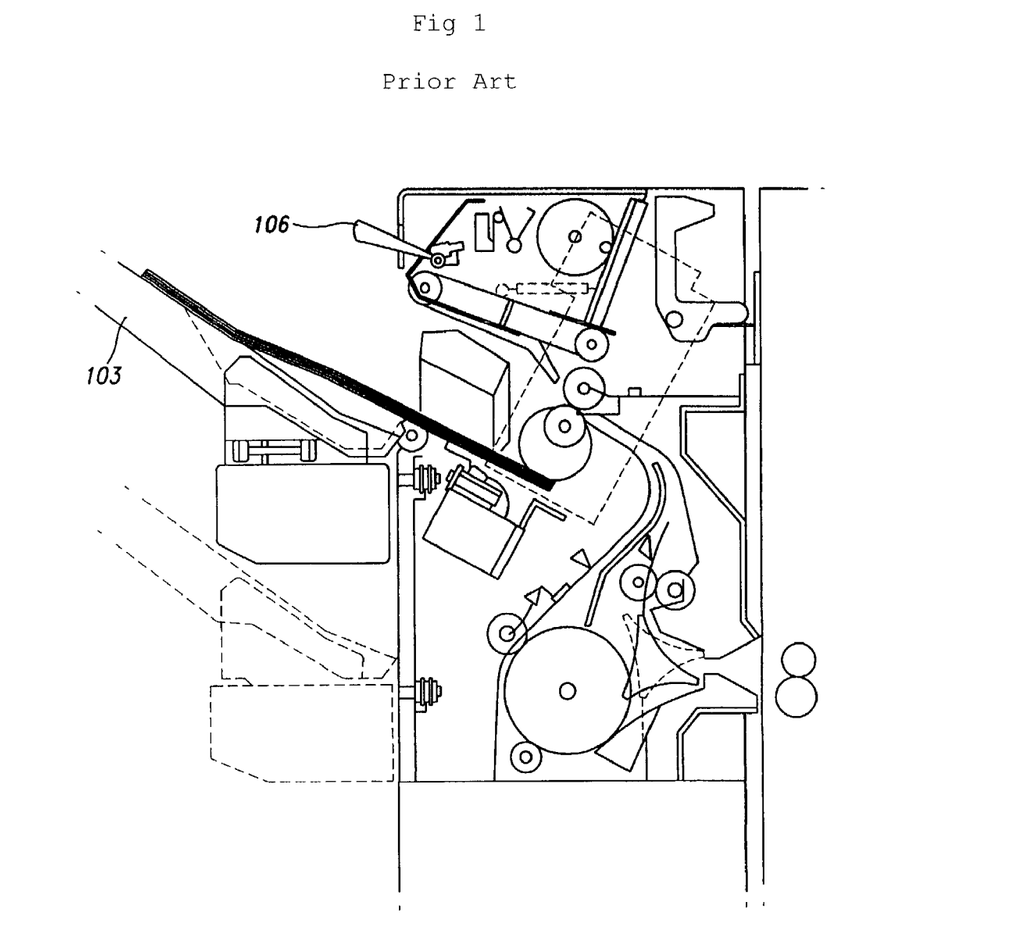
FIG. 1 is a schematic view illustrating a structure of a related art eject mechanism with a grip in a finisher.

A related art eject mechanism in a finisher, as shown in FIG. 1, has a roller structure that enables a roller 89 to move papers to a stacker tray 103 up and down. The roller structure is to movably push papers fed after moving the roller 89 to the stacker tray 103.

In the above structure, scattering or sliding of papers may occur in the process of moving papers using rotation and frictional force of the roller.

Figure 2:
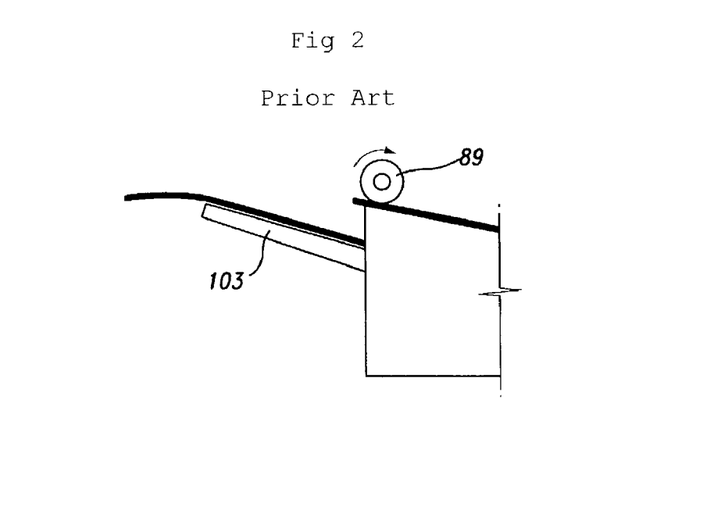
FIG. 2 is a state view illustrating a structure that is to eject papers onto a stacker tray using a roller of FIG. 1.
Figure 3:
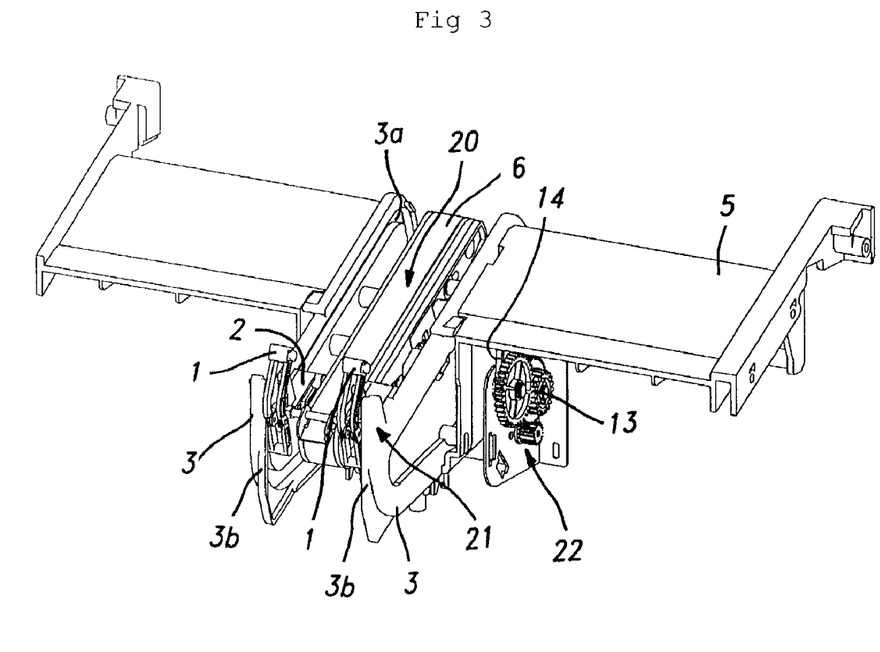
FIG. 3 is a perspective view illustrating the whole structure of an eject mechanism with a grip in a finisher according to the present invention.
Figure 4:
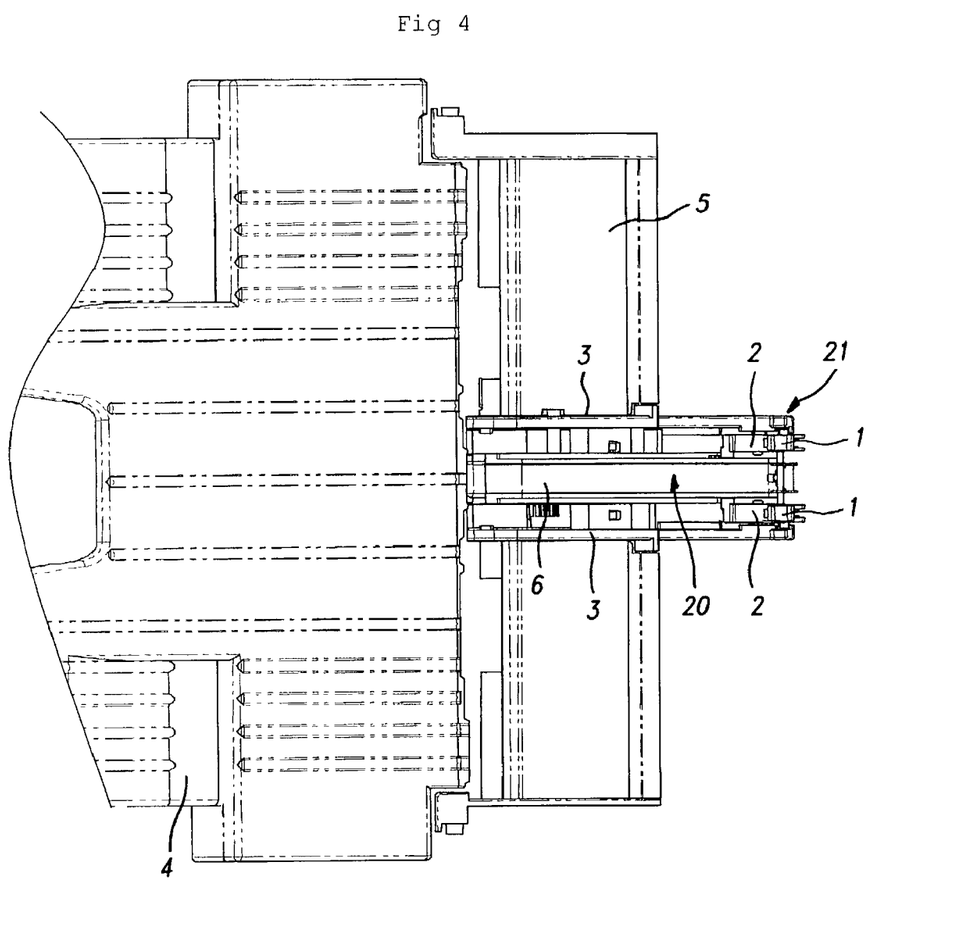
FIG. 4 is a plan view illustrating an eject mechanism with a grip in a finisher according to the present invention.
Figure 5A:
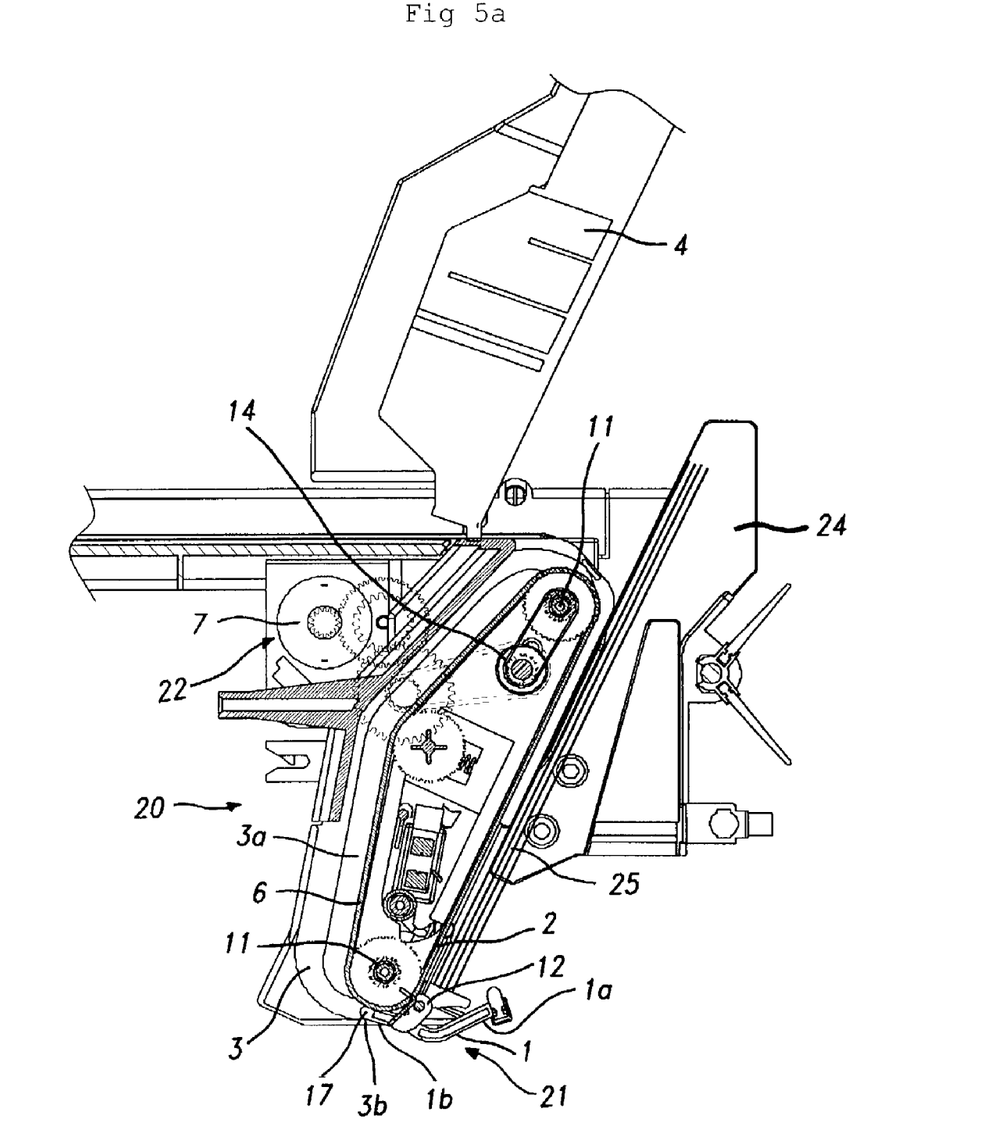
FIG. 5a is a sectional view illustrating a state before a gripper of an eject mechanism grips papers in accordance with the present invention.
Figure 5B:
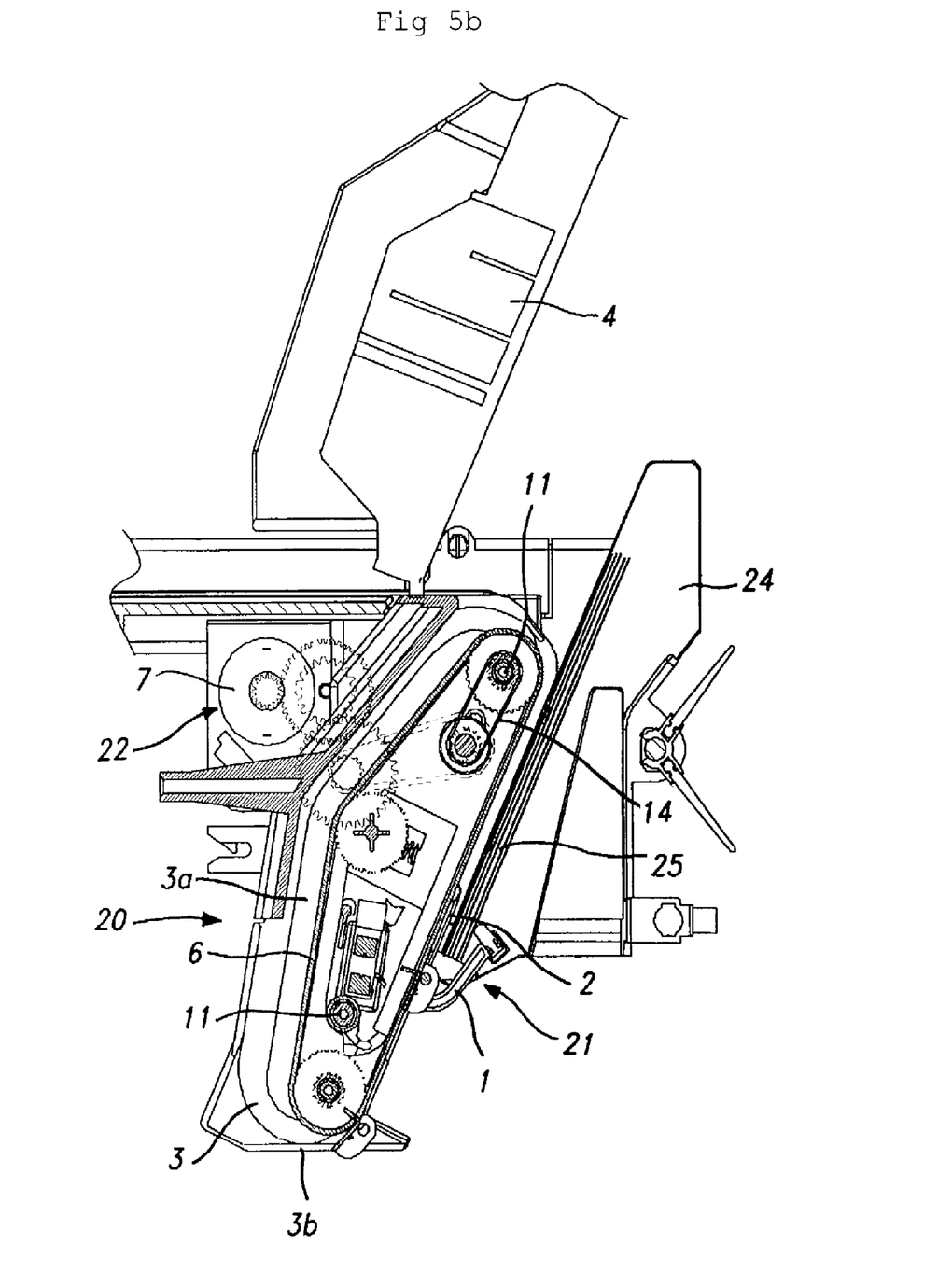
FIG. 5b is a sectional view illustrating a state where a gripper of an eject mechanism pushes papers to a stacker tray after gripping papers in accordance with the present invention.

Furthermore, as shown in FIG. 2, poor alignment of papers may occur in the process of moving the papers onto the stacker tray 103 using the roller 89. Moreover, error alignment of papers may occur due to friction between the papers when the papers are ejected onto the stacker tray 103. For this reason, inconvenience arises in that an operator should repeatedly align the papers after the papers are ejected onto the stacker tray.

SUMMARY OF THE INVENTION

Accordingly, the present invention is directed to an eject mechanism with a grip in a finisher that substantially obviates one or more of the problems due to limitations and disadvantages of the related art.

An object of the present invention is to provide an eject mechanism with a grip in a finisher in which papers ejected from a digital output device are temporarily stacked on a paper eject tray and exactly aligned so that the papers are gripped to move to a stacker tray without scattering.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, an eject mechanism with a grip in a finisher includes a paper eject tray that temporarily receives papers ejected from a digital output device, a paper moving means gripping the papers received in the paper eject tray to move them, and a stacker tray stacking the papers moved from the paper moving means, wherein the paper moving means includes a guide side plate provided with a rail groove circulating along the papers and a curved cam disposed near the rail groove, a paper grip means driven to grip the papers received in the paper eject tray when it is in contact with the curved cam while moving along the rail groove of the guide side plate, and a driving means that drives the paper grip means to circulate it along the rail groove.

The paper grip means includes a fixed shaft having both ends fitted into the rail groove in a vertical direction and moving along the rail groove, an ejector fixed to the fixed shaft, and a gripper rotatably arranged at a predetermined angle with respect to the ejector, having a first extension portion and a second extension portion which are fixed to each other by a hinge, the first extension portion being in contact with the ejector by an elastic body.

The ejector includes an ejector tray and a support projected at a predetermined angle with respect to the ejector tray, the support being fixed to the gripper by a hinge and the ejector tray being in contact with the first extension portion.

The second extension portion of the gripper includes a boss at its outer side, which is in contact with the curved cam of the guide side plate, and the first extension portion of the gripper is spaced apart from the ejector tray of the ejector when the boss is in contact with the curved cam, so as to grip the papers received in the paper eject tray.

The elastic body is a spring provided between the hinge of the gripper and the second extension portion of the gripper.

The driving means that drives the paper grip means includes a moving belt rotating along a driving rotational shaft and a driving motor that drives the driving rotational shaft.

The paper grip means is fixed to the moving belt and circulates along the rail groove by circulating the moving belt.

The moving belt fixed to the paper grip means is provided at a middle portion of the paper grip means and the guide side plate is provided at both sides of the moving belt, so that the end of the fixed shaft of the paper grip means is fitted into the rail groove of the guide side plate.

The end of the fixed shaft fitted into the rail groove is provided with a roller.

It is to be understood that both the foregoing general description and the following detailed description are exemplary and explanatory and are intended to provide further explanation of the invention as claimed.

BRIEF DESCRIPTION OF THE ATTACHED DRAWINGS

The invention will be described in detail with reference to the following drawings in which like reference numerals refer to like elements wherein:

FIG. 7 illustrates a plan structure of FIG. 6a;

DETAILED DESCRIPTION OF THE PREFERRED EMBODIMENTS

Reference will now be made in detail to the preferred embodiments of the present invention, examples of which are illustrated in the accompanying drawings.

An eject mechanism with a grip in a finisher according to the present invention is intended to grip a number of papers temporarily received in a paper eject tray so as to stably move the papers to a stacker tray without scattering. The eject mechanism of the present invention includes a paper eject tray 5 that temporarily receives papers ejected from a digital output device. The paper eject tray 5 is provided with a jogger 24 that enables the received papers to move in left and right direction so as to align the papers.

The paper eject tray 5 is provided with a paper moving means 20 at its middle portion. The paper moving means 20 grips the papers received in the paper eject tray 5 and moves the papers to a stacker tray 4. The paper moving means 20 includes a pair of guide side plates 3, a paper grip means 21 driven in a state where it is fitted into the guide side plates 3, and a driving means 22 that drives the paper grip means 21.

The guide side plates 3 of the paper moving means are arranged along the paper moving direction in parallel to the middle portion of the paper eject tray 5. The guide side plates 3 are provided with a rail groove 3a and a curved cam 3b, which form a circular track.

The circular track of the rail groove 3a is perpendicular to a surface of the paper eject tray 5. The curved cam 3b is arranged at one side of the guide side plates 3 to approach the rail groove 3a.

Meanwhile, the paper grip means 21 includes a fixed shaft 12, an ejector 2, and a gripper 1. The fixed shaft 12 has both ends fitted into the rail groove 3a and moves along the rail groove 3a. The ejector 2 is fixed to both sides of the fixed shaft 12. The gripper 1 is rotatably arranged at a predetermined angle with respect to the ejector 2. A bearing or roller 23 may be provided at the end of the fixed shaft 12 fitted into the rail groove 3a so as to smoothly move the fixed shaft 12. The ejector 2 fixed to the fixed shaft 12 includes an ejector tray 15 and a support 15a projected at a predetermined angle with respect to the ejector tray 15. The middle portion of the gripper 1 is fixed to the end of the support 15a by a hinge 16. The gripper 1 fixed to the end of the support 15a is divided into a first extension portion 1a and a second extension portion 1b around the hinge 16. The second extension portion 1b is provided with a boss 17 to be in contact with the curved cam 3b of the guide side plates 3. A spring 18 is fitted into the hinge 16 and acts to push the first extension portion 1a of the gripper 1 to the ejector tray 15 of the ejector 2.

If the ejector 2 reaches the curved cam 3b of the guide side plates in the process of moving along the rail groove 3a of the guide side plates, the boss 17 of the gripper 1 fixed to the ejector 2 is in contact with the curved cam 3b, and the second extension portion 1b of the gripper 1 connected with the boss 17 is pushed, so that the paper grip means 21 is rotated. Therefore, the first extension portion 1a of the gripper and the ejector tray 15 which are in contact with each other are spaced apart from each other by the spring 18 so that they are ready to grip the papers.

Once the ejector 2 moves along the rail groove 3a to depart from the curved cam 3b in a state where the first extension portion 1a and the ejector tray 15 are ready to grip the papers, the first extension portion 1a of the gripper 1 is in contact with the ejector tray 15 of the ejector 2 by restoring force of the spring 18. Thus, it is possible to grip the papers 25 fitted between the first extension portion 1a of the gripper 1 and the ejector tray 15 of the ejector 2.

Meanwhile, the driving means 22 that moves the paper grip means 21 along the rail groove 3a of the guide side plates 3a includes a moving belt 6 fitted between two driving rotational shafts 11 and a driving motor 7 that drives the driving rotational shafts 11. A pulley gear 13 and a timing belt 14 are interposed between the driving motor 7 and the driving rotational shafts 11 so as to transfer rotational force of the driving motor 7.

The moving belt 6 is fixed to the fixed shaft 12 of the paper grip means 21 to move the paper grip means 21 as it moves.

Since the end of the fixed shaft 12 is fitted into the rail groove 3a, the paper grip means 21 moves along the rail groove 3a.

In this case, the circular track of the moving belt 6 should substantially conform to the circular track of the rail groove 3a.

The operation of the eject mechanism with a grip in a finisher according to the present invention will now be described with reference FIGS. 6 to 9.

Figure 6A:
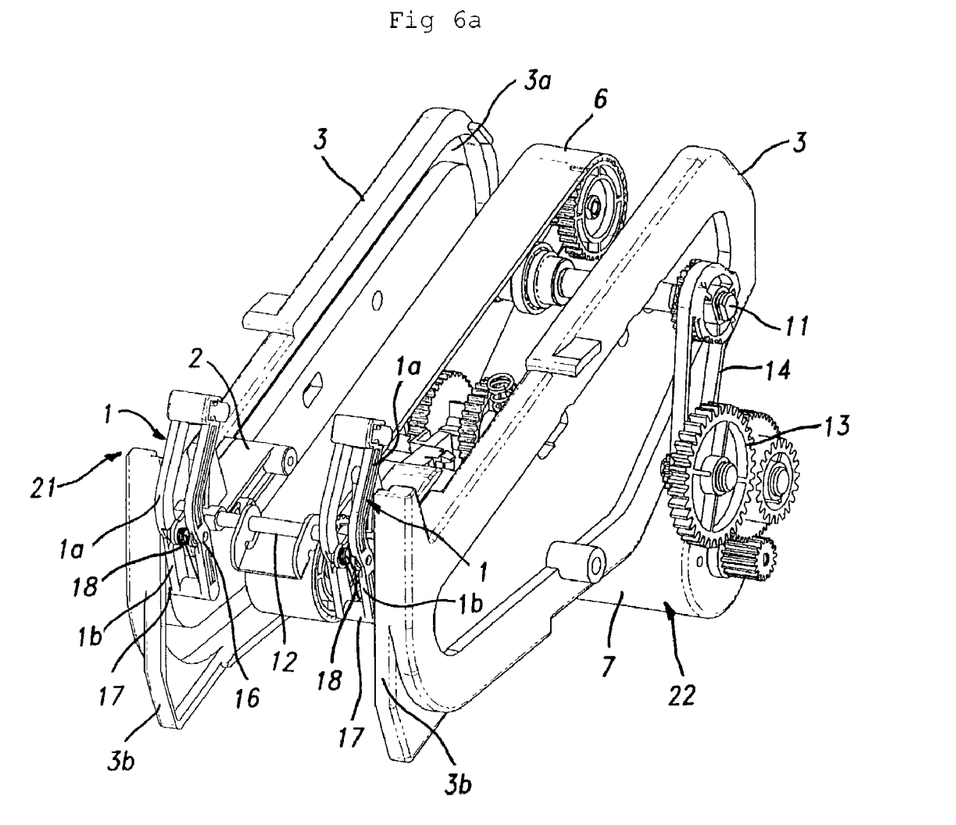
FIG. 6a is a perspective view illustrating a partial structure of an eject mechanism with a grip in a finisher according to the present invention.
Figure 6B:
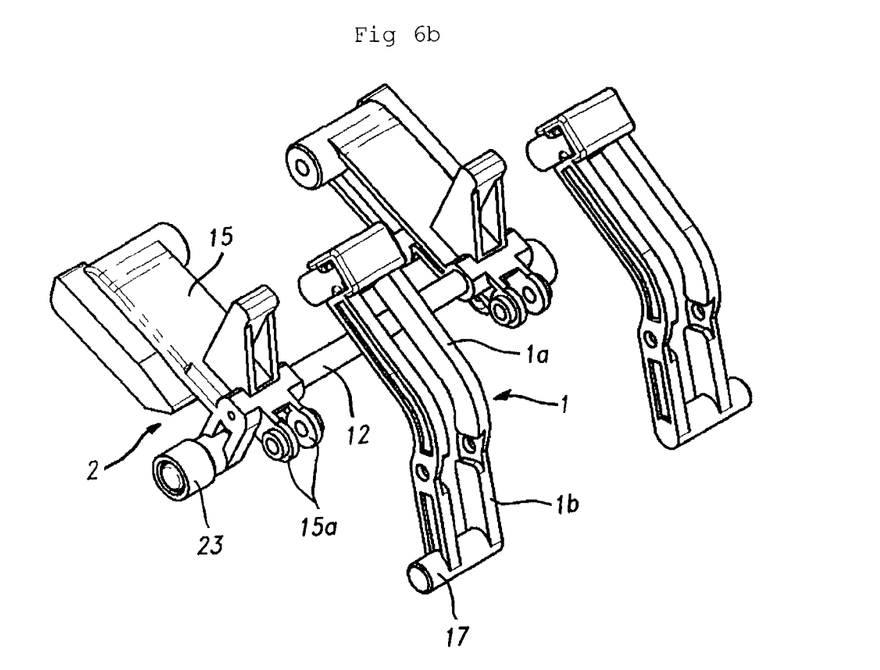
FIG. 6b illustrates a main part of a fixed shaft to which an ejector of an eject mechanism is fixed, in accordance with the present invention.
Figure 6C:
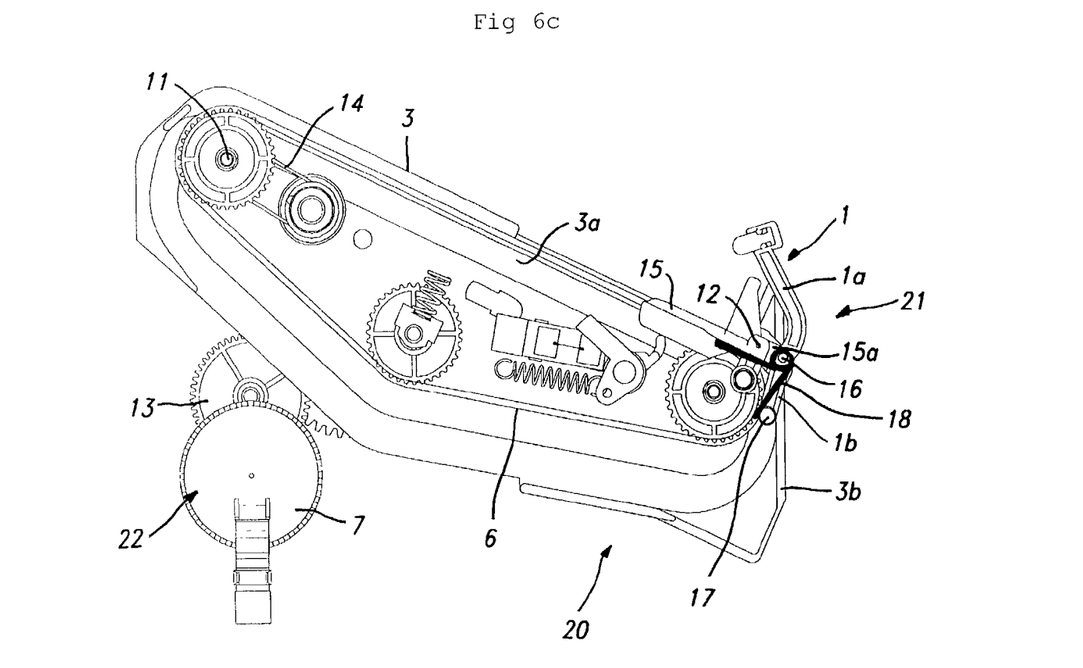
FIG. 6c illustrates a structure where an ejector of an eject mechanism is fixed to a gripper in accordance with the present invention.
Figure 7:
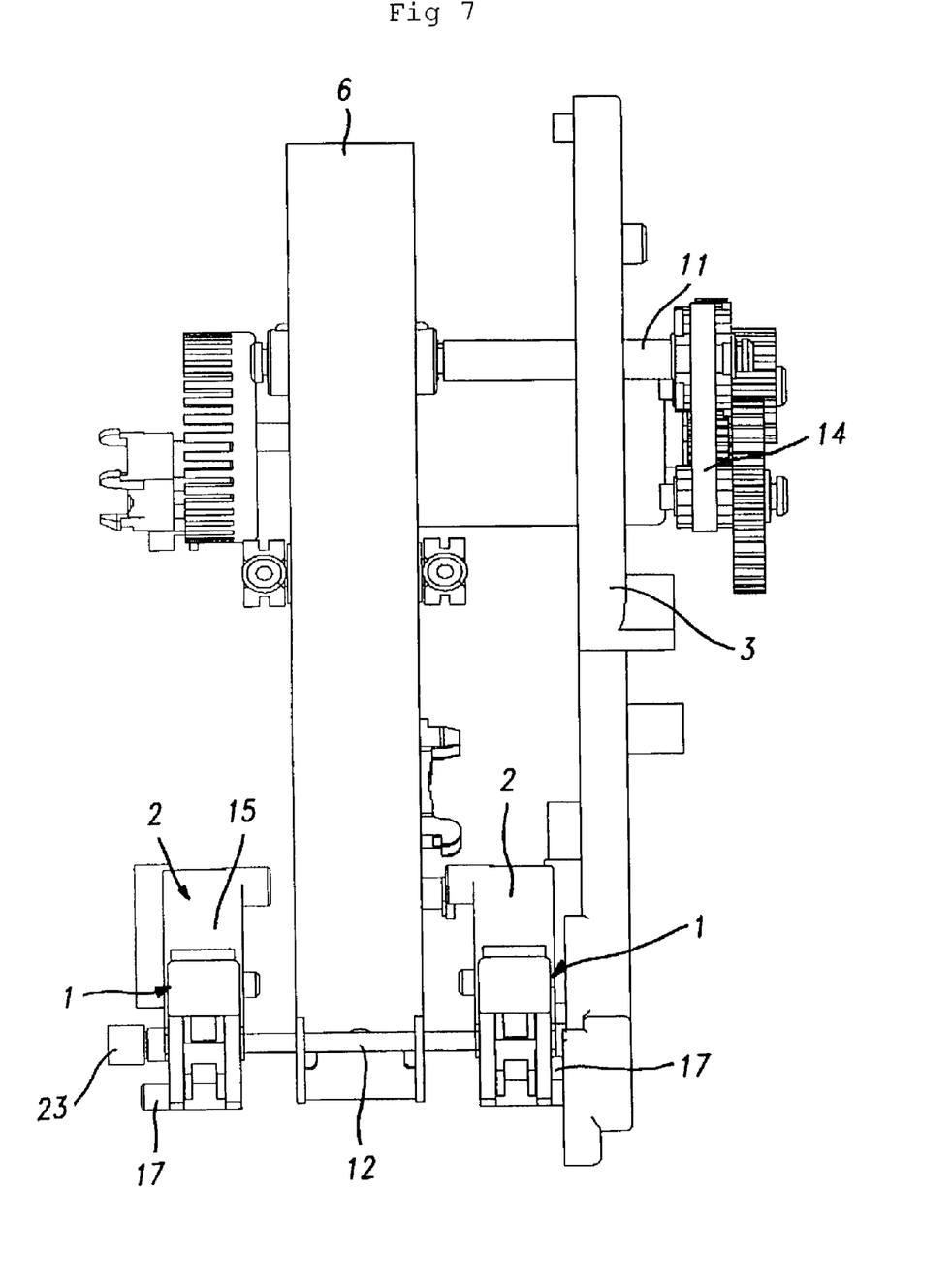
Figure 8A:
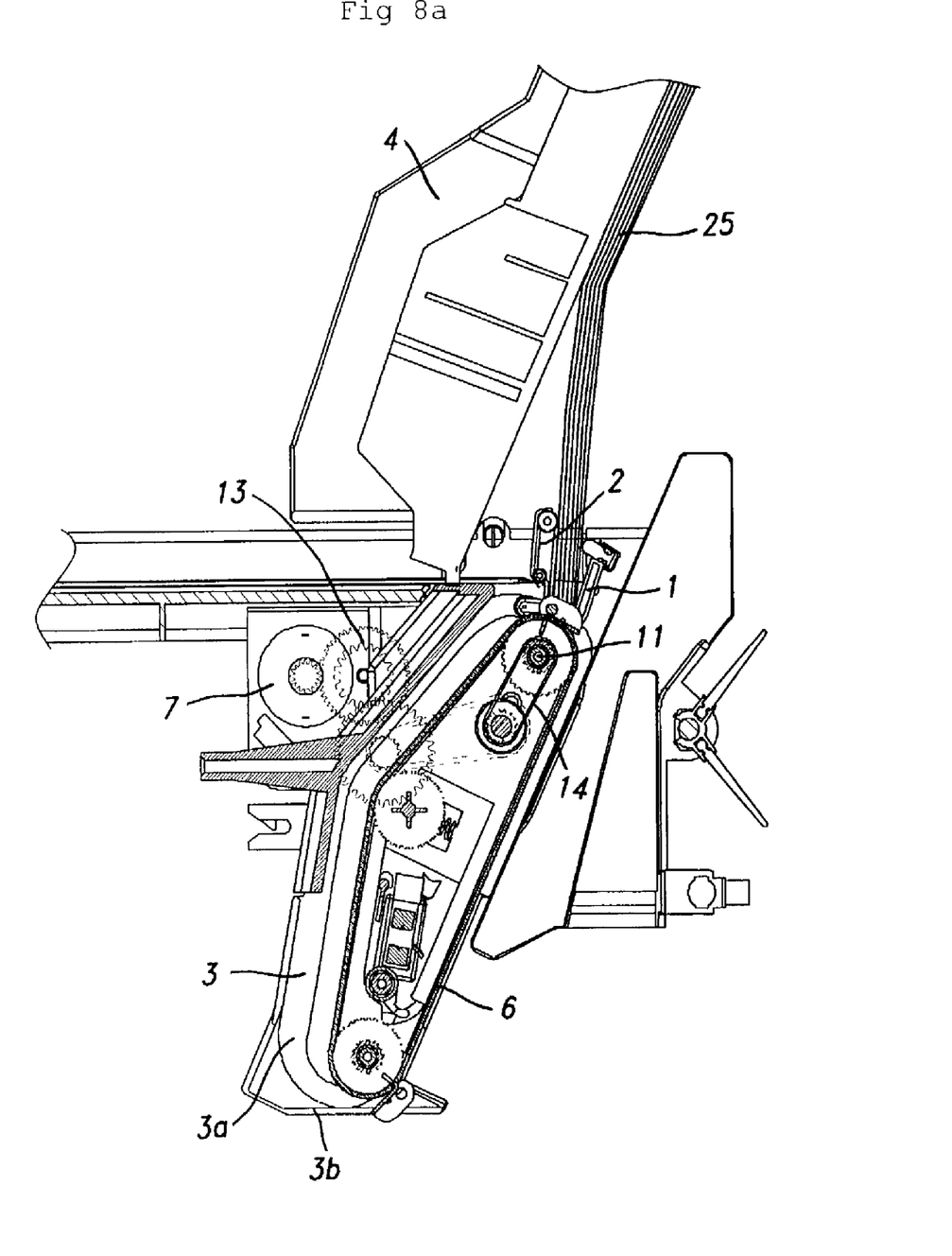
FIGS. 8a and 8b illustrate a state where a moving means of an eject mechanism ejects papers onto a stacker tray in accordance with the present invention.
Figure 8B:
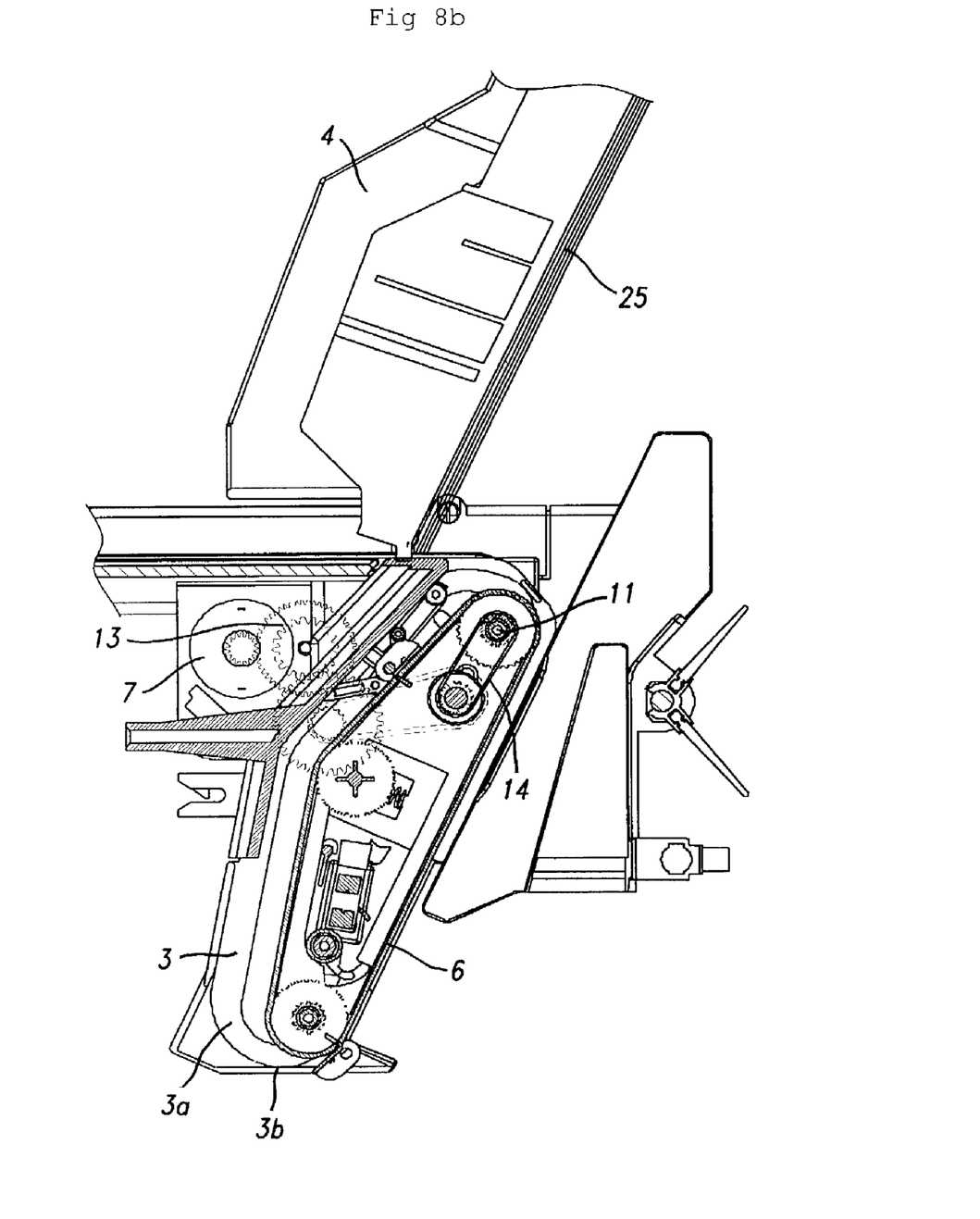
Figure 9A:
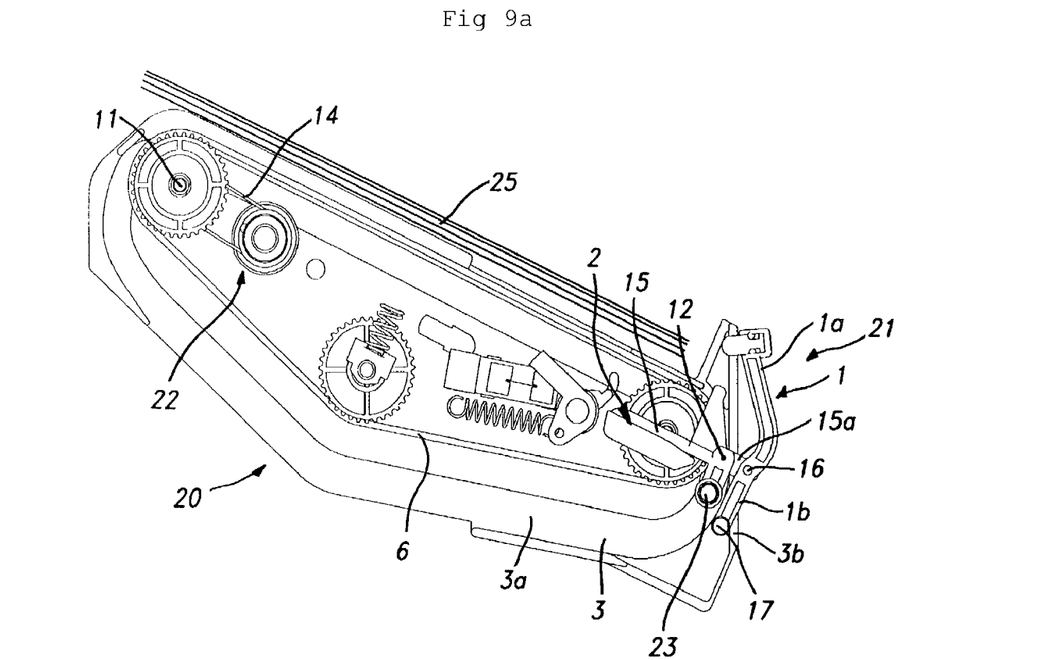
FIGS. 9a to 9e illustrate an operational state of an eject mechanism according to the present invention.

As shown in FIGS. 6c and 9a, the boss 17 is initially disposed at a starting point of the curved cam 3b of the guide side plates 3. The boss 17 is inwardly pushed as it moves along the curved cam 3b. In this case, the ejector tray 15 and the first extension portion 1a of the gripper 1, which are in contact with each other, is spaced apart from each other by the spring 18, so that they are ready to grip the papers.

In this state, the digital output device starts to carry out the copying operation in such a way that a predetermined number of papers 25 are received in the paper eject tray 5 and thus the driving motor 7 is rotated.

The rotational force of the driving motor 7 is transferred to the rotational shafts 11 and the moving belt 6 fixed to the rotational shafts 11 moves rotatably.

The ejector 2 fixed to the fixed shaft 12 moves along the rail groove 3a by a predetermined interval as the moving belt 6 moves.

Figure 9B:
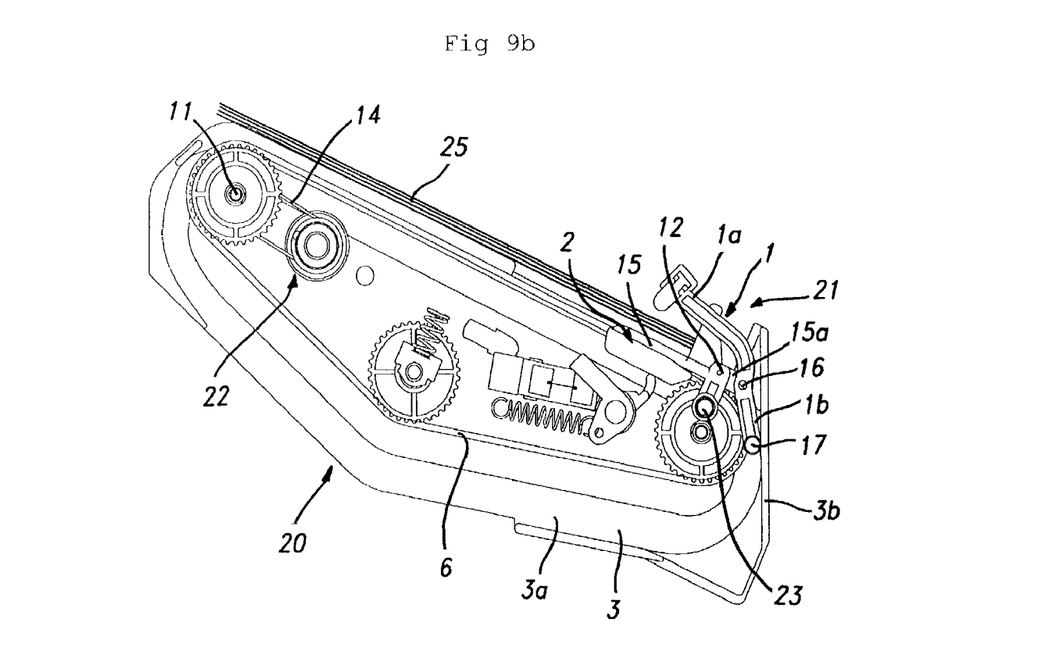
Figure 9C:
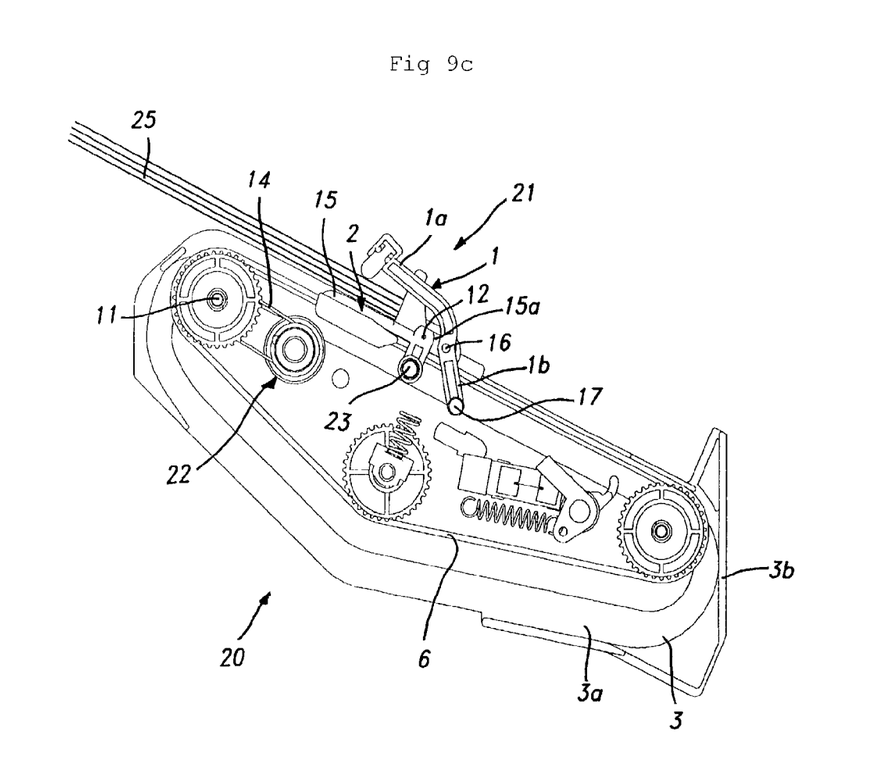

At this time, as shown in FIGS. 9b and 9c, if the boss 17 of the gripper 1 departs from the curved cam 3b as the ejector 2 moves, the gripper 1 which is fixed to the ejector 2 by the hinge 16 returns to its original position by restoring force of the spring 18.

Figure 9D:
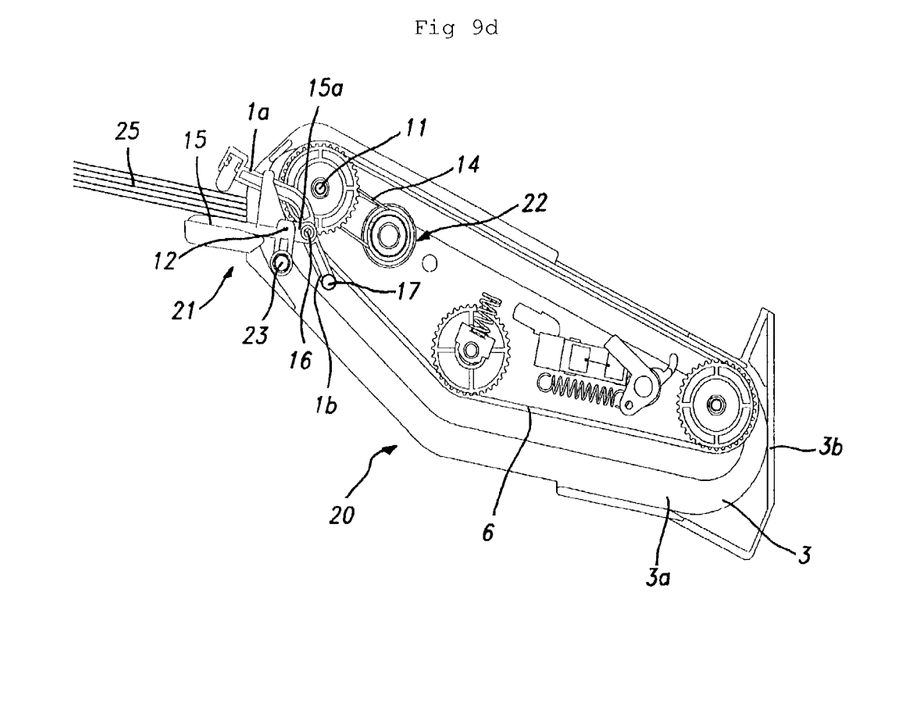

Once the gripper 1 returns to its original position, it grips the ejected papers 25. The ejector 2 moves along the rail groove 3a in a state where the gripper 1 grips the papers 25. Thus, once the ejector 2 reaches the stacker tray 4 as shown in FIG. 9d, most of the papers are in contact with the stacker tray 4.

The ejector 2 continues to rotate in a state where the papers are in contact with the stacker tray 4, and moves downwardly. The first extension portion 1a that grips the end of the papers is pushed up in a moment by overcoming elastic force of the spring 18. As a result, the gripped papers are placed on the stacker tray 4.

Figure 9E:
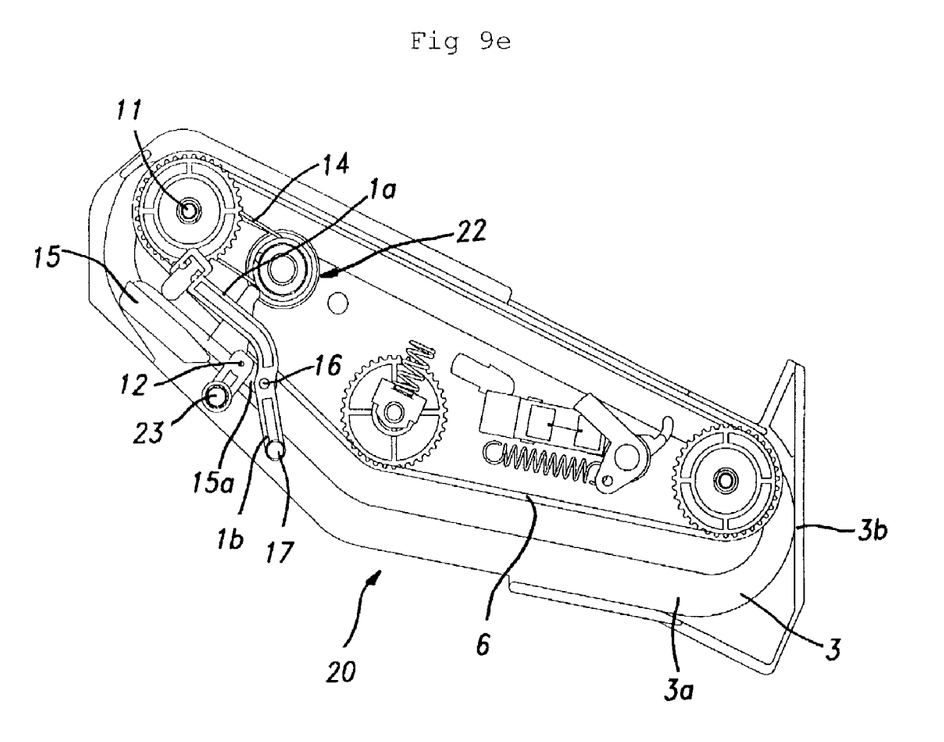

After the first extension portion 1a moves the gripped papers onto the stacker tray, the first extension portion 1a and the ejector tray 15 of the ejector 2 return to their original position in a state where they are in contact with each other as shown in FIG. 9e. Then, the first extension portion 1a and the ejector tray 15 move to the curved cam 3b along the rail groove 3a.

As aforementioned, the eject mechanism with a grip in a finisher according to the present invention has the following advantages.

Since a number of papers ejected from the digital output device are gripped and stacked on the stacker tray without being directly pushed to the stacker tray, they can be aligned and thus can be ejected onto the tray without scattering. Also, it is possible to avoid any inconvenience that may occur as the ejected papers should repeatedly be aligned.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An eject mechanism with a grip in a finisher comprising:
   a paper eject tray that temporarily receives papers ejected from a digital output device;
   a paper moving means gripping the papers received in the paper eject tray to move them, the paper moving means including
      a guide side plate provided with a rail groove circulating along the papers and a curved cam disposed near the rail groove,
      a paper grip means driven to grip the papers received in the paper eject tray when it is in contact with the curved cam while moving along the rail groove of the guide side plate, and
      a driving means that drives the paper grip means to circulate it along the rail groove; and
   a stacker tray stacking the papers moved from the paper moving means,
   wherein the paper grip means includes a fixed shaft having both ends fitted into the rail groove in a vertical direction and moving along the rail groove, an ejector fixed to the fixed shaft, and a gripper rotatably arranged at a predetermined angle with respect to the ejector, having a first extension portion and a second extension portion which are fixed to each other by a hinge, the first extension portion being in contact with the ejector by an elastic body.

2. The eject mechanism of claim 1, wherein the ejector includes an ejector tray and a support projected at a predetermined angle with respect to the ejector tray, the support being fixed to the gripper by a hinge and the ejector tray being in contact with the first extension portion.

3. The eject mechanism of claim 1, wherein the second extension portion of the gripper includes a boss at its outer side, which is in contact with the curved cam of the guide side plate, and the first extension portion of the gripper is separated from the ejector tray of the ejector when the boss is in contact with the curved cam, so as to grip the papers received in the paper eject tray.

4. The eject mechanism of claim 1, wherein the elastic body is a spring provided between the hinge of the gripper and the second extension portion of the gripper.

5. The eject mechanism of claim 1, wherein the driving means that drives the paper grip means includes a moving belt rotating along a driving rotational shaft and a driving motor that drives the driving rotational shaft.

6. The eject mechanism of claim 5, wherein the paper grip means is fixed to the moving belt and circulates along the rail groove by circulating the moving belt.

7. The eject mechanism of claim 5, wherein the moving belt fixed to the paper grip means is provided at a middle portion of the paper grip means and the guide side plate is provided at both sides of the moving belt, so that the end of the fixed shaft of the paper grip means is fitted into the rail groove of the guide side plate.

8. The eject mechanism of claim 5, wherein the end of the fixed shaft fitted into the rail groove is provided with a roller.

* * * * *